United States Patent [19]
Saito et al.

[11] Patent Number: 4,472,947
[45] Date of Patent: Sep. 25, 1984

[54] ABSORPTION REFRIGERATING SYSTEM

[75] Inventors: Shozo Saito; Naoyuki Inoue; Toshihiro Okuda, all of Kanagawa, Japan

[73] Assignee: Ebara Corporation, Tokyo, Japan

[21] Appl. No.: 438,261

[22] Filed: Nov. 1, 1982

[30] Foreign Application Priority Data

Nov. 4, 1981 [JP] Japan .................................. 56-175679

[51] Int. Cl.³ .............................................. F25B 15/00
[52] U.S. Cl. ...................................... 62/141; 62/476; 62/489
[58] Field of Search .......................... 62/476, 141, 489

[56] References Cited

U.S. PATENT DOCUMENTS

| | | | |
|---|---|---|---|
| 3,426,547 | 2/1969 | Foster | 62/489 X |
| 3,553,977 | 1/1971 | Holman | 62/489 |
| 3,575,008 | 4/1971 | Lorenz | 62/476 X |
| 3,721,109 | 3/1973 | Porter | 62/476 |
| 3,864,929 | 2/1975 | Hopkins | 62/476 X |

*Primary Examiner*—Lloyd L. King
*Attorney, Agent, or Firm*—Oblon, Fisher, Spivak, McClelland & Maier

[57] ABSTRACT

An absorption refrigerating system is provided wherein the total circulation flow rate of a diluted solution (absorbing liquid) by pumps is adjustable according to the measured change in the refrigerating load so that the flow rate of the diluted solution is kept at desirable levels to balance with changing refrigerating load.

18 Claims, 4 Drawing Figures

ABSORPTION REFRIGERATING SYSTEM

BACKGROUND OF THE INVENTION

1. Field of the Invention:

The present invention relates to an inexpensive and efficient energy-saving absorption refrigerating system and more particularly to an improvement for reducing the amount of operation energy which has heretofore been wasted in an absorption refrigerating system comprising an evaporator, an absorber, a generator or generators, a condenser, a heat exchanger or heat exchangers, piping interconnecting these and pumps.

2. Description of the Prior Art:

The amount of heat required to be provided by a heater for the operation of an absorption refrigerating system is generally shown by the following formula (1):

$$Q_G \times W \times \Delta i + LH \times S \quad (1)$$

where
- $Q_G$: Generator input heat
- W: Flow rate of a circulated solution
- $\Delta i$: Raise in enthalpy of the solution by heating
- LH: Latent heat of a refrigerant
- S: Amount of the refrigerant evaporated The formula (1) can be divided into two portions, namely (A) portion comprising $W \times \Delta i$ and (B) portion comprising $LH \times S$. The (B) portion is proportional to refrigerating load and is effectively used as refrigerating output. The (A) portion, on the other hand, is radiated as a heat loss at a cooling tower provided in the cooling water circuit.

Regarding an absorption refrigerating system energy-saved operation is possible by keeping the flow rate of the circulated solution W at a desired level.

Examples of prior art are explained below based on attached figures.

FIG. 1 is a schematic illustration of a system representing one of the conventional single effect absorption refrigerating systems. FIG. 2 is a schematic illustration of a system representing one of the conventional double effect absorption refrigerating systems.

In the system illustrated in FIG. 1, there are provided an absorber 1, an evaporator 2, a generator 3, a condenser 4, a solution pump 5, a refrigerant pump 6, a heat exchanger 7, a steam pressure control valve 8, a level switch 9 and an overflow pipe 10.

In the system illustrated in FIG. 2, the components 1, 2, 4, 5, 6 and 8 represent the same as in FIG. 1. There are provided further a first generator 11, a second generator 12, a second heat exchanger 13, a first heat exchanger 14, a flow control valve 15, a drain heat exchanger 16 and drain trap 17.

The solution (absorbing liquid) in the absorber 1 which has been diluted by absorbing refrigerant used for chilling chilled water is fed by the solution pump 5 through the heat exchanger 7 to the generator 3, where the solution is concentrated separating refrigerant from the solution by means of the heat of steam or combustion gas. The separated refrigerant is condensed in the condensor 4 by the effect of cooling water. The concentrated solution returns through a heat exchanger to the absorber 1, where the solution is diluted by absorbing the refrigerant and is fed again to the generator 3 by means of the pump 5. The refrigerant condensed in the condenser 4 returns to the evaporator 2, where the refrigerant is used to chill the chilled water. The evaporator, absorber, generator or generators and condenser or condensers form a closed circuit and the total amount of the refrigerant and the solution in the system is always kept constant. In the cooling water circuit, a cooling tower (not shown in figures) is provided.

In this system, however, the (A) portion, $W \times \Delta i$, in the formula (1) is not proportional to refrigerating load and is constant since the flow rate W of the solution is constant by using a single fixed volume solution pump. Thus, under partial load condition, energy saving is not achieved since no change in the (A) portion causes the increase of $Q_G$ per unit refrigerating load.

In the double effect absorption refrigerating system, a flow control valve is provided in the solution line as shown 15 in FIG. 2 for energy saving under partial load condition. The use of a flow control valve allows linear flow rate control. However, due to valve characteristics, strict control is difficult. For example, 70% flow rate is obtained generally instead of 50% under 50% load. Therefore, the amount of saved energy is not satisfactory. In addition, expensiveness of the valve is another problem.

Further, there is a U.S. Pat. No. 3,279,206 relating to energy saving absorption refrigerating system which uses a variable capacity pump for energy saving operation under partial load condition by reducing the flow rate of a circulated solution W. However, it is a considerable problem that the use of a variable capacity pump is very expensive.

Therefore, it has been desired to achieve a reduction in operating cost and an increase in refrigerating system efficiency by decreasing $W \times \Delta i$ of the (A) portion in the above mentioned formula (1) so as to reduce $Q_G$ as much as possible. In addition, it has been desired to achieve the same without using an expensive flow control valve or an expensive variable capacity pump.

SUMMARY OF THE INVENTION

Accordingly it is an object of this invention to provide an absorption refrigerating system wherein energy is saved by preventing the loss of operation heretofore wasted under partial load condition.

It is another object of the present invention to provide an absorption refrigerating system wherein energy saving is made possible by reducing the flow rate of the circulated solution under partial load condition.

It is a further object of the present invention to provide an absorption refrigerating system wherein energy saving is made possible by adjusting the flow rate of the circulated solution according to the change in refrigerating load observed either directly or indirectly.

It is also another object of the present invention to provide an absorption refrigerating system wherein energy saving is made possible without using an expensive flow control valve or an expensive variable capacity pump.

According to the present invention, the objects above are achieved by an absorption refrigerating system wherein a pump device is provided which is capable of adjusting the flow rate of a diluted solution fed from the absorber to the generator without using a variable capacity pump according to measured change in refrigerating load.

DETAILED DESCRIPTION OF THE PREFERRED EMBODIMENTS

Figure 1:
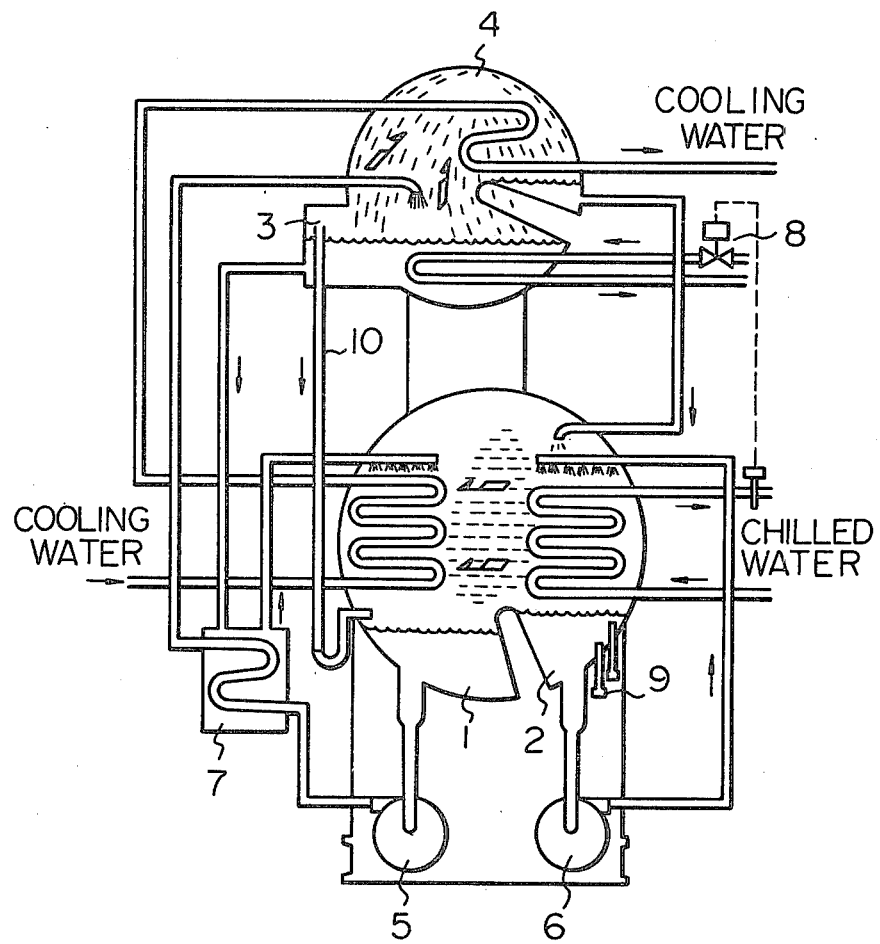
FIG. 1 is a schematic illustration of a system representing one of the conventional single effect absorption refrigerating systems.
Figure 3:
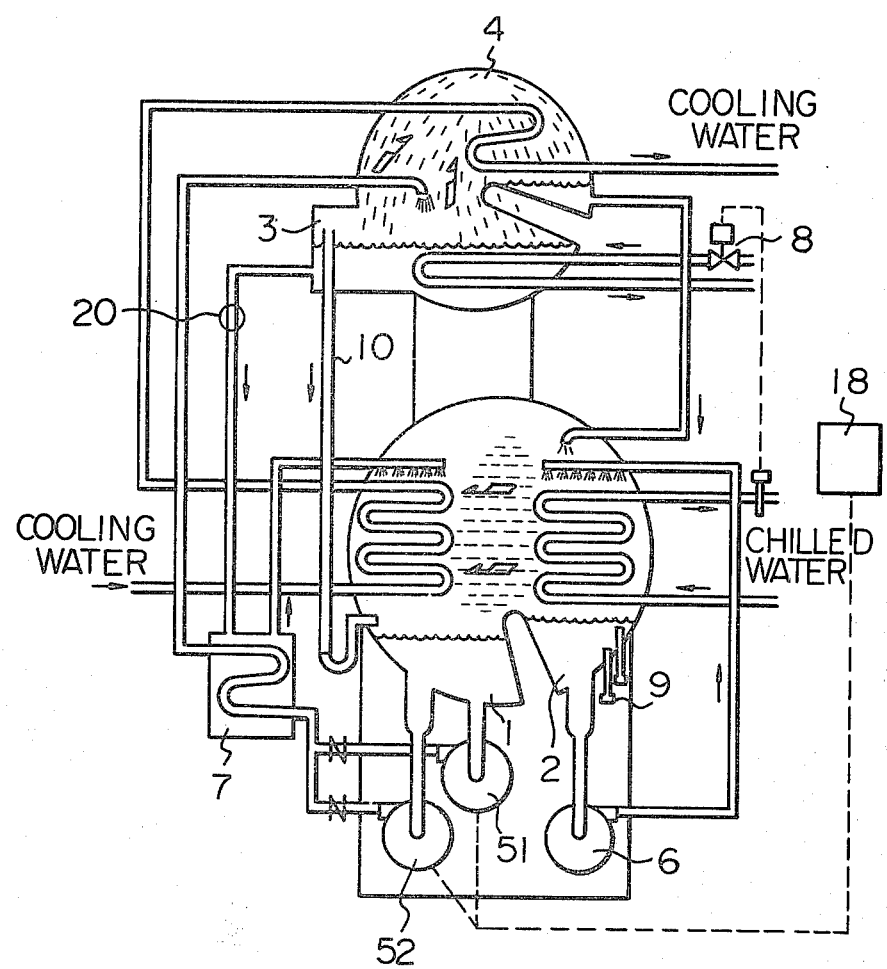
FIG. 3 is a schematic illustration of a system representing one of the preferred embodiments of the present invention applied to a single effect absorption refrigerating system.

FIG. 3 is a schematic illustration of a system representing one of the preferred embodiments of the present invention applied to a single effect absorption refrigerating system. In this example, two fixed volume pumps are used. In the system illustrated in FIG. 3, the components 1 through 4 and 6 through 10 represent the same as in FIG. 1. There are provided further a thermometer for measuring soluton temperature 20, solution pumps 51 and 52 and pump on-off controller 18. When two or more fixed volume pumps are used in the present invention, the pumps are on-off controled according to the change in refrigerating load. The change in refrigerating load can be measured either directly or indirectly as follows.

(I) Direct measurement of refrigerating load.

Refrigerating load $Q_E$ can be shown as formula (2) below.

$$Q_E = G \times SH \times SG \times (T_1 - T_2) \quad (2)$$

where
  G: Flow rate of a circulated chilled water (m³/h)
  SH: Specific heat of the chilled water (Kcal/Kg,°C.)
  SG: Specific gravity of the chilled water (Kg/m³)
  $T_1$: Inlet temperature of the chilled water (°C.)
  $T_2$: Outlet temperature of the chilled water (°C.)

Therefore, the change in refrigerating load can be known directly by measuring inlet and outlet temperature and flow rate, specific heat and specific gravity of the chilled water. As another way, the change in refrigerating load can be known directly by measuring the temperature and humidity, etc. of the room to be cooled. The on-off control of the solution pumps is made according to the measured changes.

(II) Indirect measurement of refrigerating load.

The change in refrigerating load can be known indirectly by measuring the quantities of external state, for example, quantities relating to cooling water, steam and fuel, etc. or the quantities of internal cycle which change accompanying above mentioned refrigerating load change.

(A) Measurement of the quantities of external state.

With the change in refrigerating load the amount of heat radiated from the cooling tower changes. Regarding steam flow rate, it is necessary to adjust the valve position for changing flow rate under constant primary pressure. This adjustment of the valve position causes valve outlet pressure change.

Therefore, the change in refrigerating load can be known indirectly by measuring such quantities of external state as the steam pressure or steam valve position (or fuel valve position in the case of direct fired type heater chiller wherein heat is given directly from a combustion gas), flow rate or the temperature of the steam (exhaust gas temperature in the case of direct fired type heater chiller), inlet and outlet temperature of the cooling water at the cooling tower or flow rate or temperature of drain water condensed from the steam passed through the generator, etc.

(B) Measurement of the quantities of internal cycle.

Accompanying the change in refrigerating load, the quantities of internal cycle change.

Therefore, the change in refrigerating load can be known indirectly by measuring such quantities of internal cycle as concentration of the solution (refrigerant or solution surface level in the evaporator or absorber which is related to the concentration of the solution directly), temperature of the solution, generator internal pressure or the dew point of the refrigerant in the generator, condenser internal pressure or the condensation temperature of the refrigerant in the condenser or flow rate of returning refrigerant, etc.

In the present invention, the reduction in the fuel consumption and the pump driving energy has been achieved by controlling the total outlet flow rate of the solution pumps according to refrigerating load measured either directly or indirectly as explained above.

An effect obtained from one embodiment of the present invention wherein two fixed volume solution pumps are used is explained below based on the attached figure.

Figure 2:
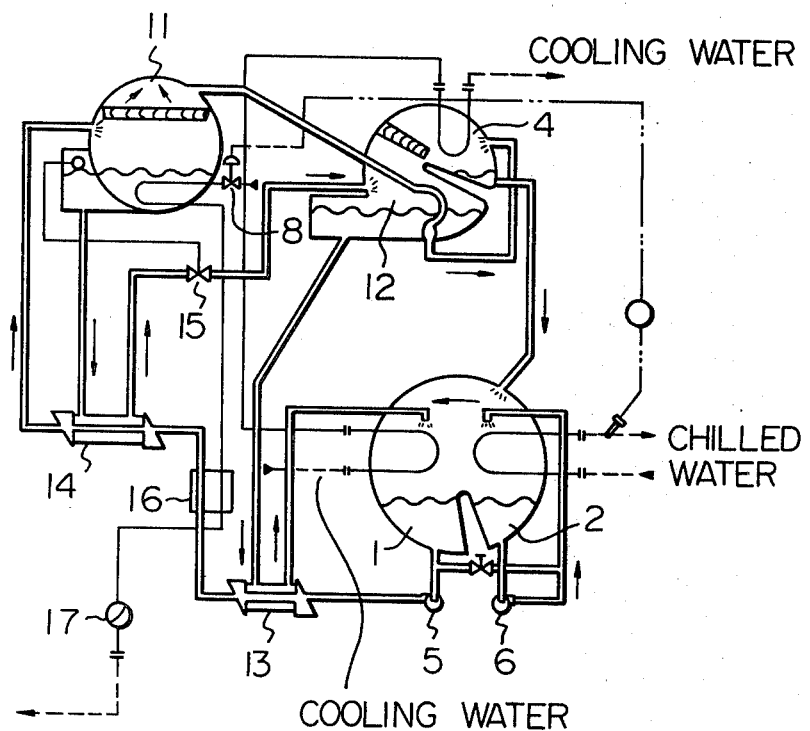
FIG. 2 is a schematic illustration of a system representing one of the conventional double effect absorption refrigerating systems.
Figure 4:
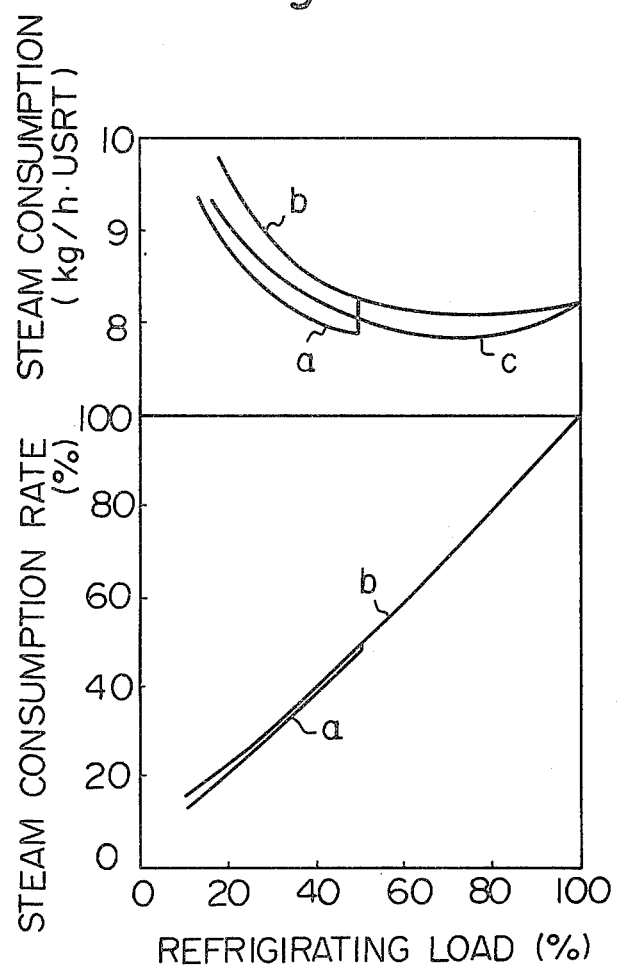
FIG. 4 is a graphic chart showing an example of the relation between refrigerating load and steam consumption with respect to the prior art and the present invention.

FIG. 4 is a graphic chart showing the relation between the load and the steam consumption with respect to the prior art and the present invention. The upper part of FIG. 4 shows the relation between refrigerating load (%) (horizontal axis) and steam consumption (Kg/h·USRT) (vertical axis), and the lower part of FIG. 4 shows the relation between refrigerating load (%) (horizontal axis) and steam consumption rate (%) (vertical axis). The line "a" represents an absorption refrigerating system with two on-off controlled fixed volume pumps. The line "b" represents an absorption refrigerating system of conventional type with no on-off controlled fixed volume pump. The line "c" represents an absorption refrigerating system of conventional type with a flow control valve as shown in FIG. 2.

In the present invention, as clearly shown in FIG. 4, steam consumption rate can be reduced from 8.3 Kg/h·USRT of the conventional absorption refrigerating system (b) to 7.9 Kg/h·USRT when one pump is stopped under 50% load. In the case of an absorption refrigerating system with a flow control valve as shown in FIG. 2, energy is saved over almost all the load range as shown in FIG. 4 upper portion; however, the pump of the on-off control system provide a larger energy saving when one of the two pumps is stopped.

The present invention has been explained in detail with respect to a single effect absorption refrigerating system with two fixed volume pumps; however, it will be obvious that the present invention is applicable to a double effect absorption refrigerating system, an absorption refrigerating system with three or more fixed volume pumps.

The use of two or more pumps will raise the cost of the absorption refrigerating system; however, considering the reduction in steam consumption as explained with respect to FIG. 4, the expense for adding a pump will be recovered in a short time. (As an example ½ to ⅓ year on the following conditions: An absorption refrigerating system of 1000 USRT is operated for 1200 hours a year. For 600 hours among the 1200 hours, the refrigerating load is below 50% with the average 40%. Cost of steam: 2.8 cent/Kg. Expense for adding a pump: 1000 to 1400 dollers. (Calculated based on 1 dollar=250 yen).

In addition, when two or more fixed volume pumps are used, the present invention will allow producing the same type pump in quantity promoting standardization of the pumps, which will enable to lower the pump price. Further, an expensive conventional flow control valve or an expensive variable capacity pump does not need to be used. Taking these also into account, the present invention is considered to have remarkable effect.

What is claimed is:

1. An absorption refrigerating system comprising:
   (a) an evaporator;
   (b) an absorber;
   (c) at least one generator;
   (d) a condenser;
   (e) at least one heat exchanger;
   (f) a pump device for feeding a solution including a refrigerant to said at least one generator, said pump device comprising at least two fixed volume pumps which are connected in parallel with each other and which are on-off controlled independently of each other according to changes in the load of the refrigerating system; and
   (g) piping interconnecting the foregoing elements.

2. An absorption refrigerating system comprising:
   (a) an absorber;
   (b) an evaporator in fluid communication with said absorber;
   (c) at least one generator;
   (d) a condenser in fluid communication with said at least one generator;
   (e) at least one heat exchanger;
   (f) a pump device for feeding a solution to said at least one generator, said pump device comprising at least two fixed volume pumps which are connected in parallel with each other and which are on-off controlled so that the percentage of the total number of fixed volume pumps on line at any given time is at least approximately proportional to the load of the refrigerating system;
   (g) piping interconnecting said absorber and said at least two fixed volume pumps;
   (h) piping interconnecting said at least two fixed volume pumps and said at least one heat exchanger;
   (i) piping interconnecting said at least one heat exchanger and said condenser; and
   (j) piping interconnecting said generator and said absorber.

3. An absorption refrigerating system as claimed in claim 1, wherein said change in refrigerating load is measured directly by measuring the refrigerating load.

4. An absorption refrigerating system as claimed in claim 1, wherein said change in refrigerating load is caught indirectly by measuring the change in quantities of external state which change accompanying said refrigerating load change.

5. An absorption refrigerating system as claimed in claim 1, wherein said change in refrigerating load is measured indirectly by measuring the change in quantities of internal cycle which change accompanying said refrigerating load change.

6. An absorption refrigerating system as claimed in claim 5, wherein said change in refrigerating load is measured indirectly by measuring the temperature of a solution returning from the generator to the absorber.

7. An absorption refrigerating system as claimed in claim 3, wherein said change in refrigerating load is measured directly by measuring the flow rate and inlet and outlet temperature difference of the chilled water.

8. An absorption refrigerating system as claimed in claim 3, wherein said change in refrigerating load is measured directly by measuring inlet and outlet temperature difference of the chilled water under constant flow rate.

9. An absorption refrigerating system as claimed in claim 3, wherein said change in refrigerating load is measured directly by measuring the temperature and/or humidity of the room to be cooled.

10. An absorption refrigerating system as claimed in claim 4, wherein said change in refrigerating load is measured indirectly by measuring inlet temperature, outlet temperature or inlet and outlet temperature difference of the cooling water at a cooling tower.

11. An absorption refrigerating system as claimed in claim 4, wherein said change in refrigerating load is measured indirectly by measuring steam pressure in the system.

12. An absorption refrigerating system as claimed in claim 4, wherein said change in refrigerating load is measured indirectly by measuring the temperature of the drain water condensed from said at least one steam passed through the generator.

13. An absorption refrigerating system as claimed in claim 4, wherein said change in refrigerating load is measured indirectly by measuring the flow rate of the steam in the system.

14. An absorption refrigerating system as claimed in claim 4, wherein said change in refrigerating load is measured indirectly by measuring the flow rate of drain water condensed from said at least one steam passed through the generator.

15. An absorption refrigerating system as claimed in claim 5, wherein said change in refrigerating load is measured indirectly by measuring the concentration of the solution.

16. An absorption refrigerating system as claimed in claim 5, wherein said change in refrigerating load is measured indirectly by measuring the refrigerant surface level in the evaporator.

17. An absorption refrigerating system as claimed in claim 5, wherein said change in refrigerating load is measured indirectly by measuring the solution surface level in said absorber.

18. An absorption refrigerating system as claimed in claim 5, wherein said change in refrigerating load is measured indirectly by measuring the condensation temperature of the refrigerant in said condenser.

* * * * *